United States Patent

[11] 3,628,298

| [72] | Inventor | Raymond W. Sickler<br>RD #2, Wellsburg, N.Y. 14894 |
|---|---|---|
| [21] | Appl. No. | 882,588 |
| [22] | Filed | Dec. 5, 1969 |
| [45] | Patented | Dec. 21, 1971 |

[54] DECORATIVE SHUTTER FOR MOBILE HOMES AND THE LIKE
4 Claims, 5 Drawing Figs.

[52] U.S. Cl. .................................................. 52/473, 52/483, 52/669
[51] Int. Cl. ................................................... E04c 2/42, E06b 9/01
[50] Field of Search .................................................. 52/473, 222, 478, 482, 483, 494, 511, 506, 507, 557, 664, 669, 313, 314, 311, 273, 74, 75, 76; 256/22

[56] References Cited
UNITED STATES PATENTS

| 1,668,651 | 5/1928 | McKinnon ..................... | 258/22 |
| 2,250,764 | 7/1941 | Hoess ........................... | 52/313 X |
| 2,766,967 | 10/1956 | Roberts ........................ | 256/22 |
| 3,364,643 | 1/1968 | Smith et al. .................. | 52/473 X |
| 3,383,819 | 5/1968 | Zimmer et al. ............... | 52/483 |

*Primary Examiner*—Price C. Faw, Jr.
*Attorney*—Shoemaker & Mattare

ABSTRACT: A decorative shutter for mobile homes and the like comprising a plurality of vertically arrayed extruded aluminum panels held in a desired assembled fashion by means of horizontally disposed extruded aluminum stringers having a plurality of short tabs punched therefrom which receive opposite edge portions of the vertically arrayed panels. The assembled shutter is affixed to the side of the mobile home or the like by means of suitable fastening means passed through the stringers into the side of the mobile home or the like.

PATENTED DEC 21 1971  3,628,298

INVENTOR
RAYMOND W. SICKLER

BY Shoemaker and Mattare

ATTORNEYS

DECORATIVE SHUTTER FOR MOBILE HOMES AND THE LIKE

BACKGROUND OF THE INVENTION

An easily adjustable and modifiable decorative shutter for mobile homes and the like is provided for attachment to mobile homes and the like in a simple and economical manner to enhance the appearance of the mobile home and the like. Conventional shutters are generally unsuitable for use of mobile homes and the like due to their bulk and because the shape and size of windows in mobile homes and the like are generally different from windows in permanent residences or the like where such conventional shutters are normally intended to be used.

The present invention, because of its simple and economical construction, its light weight and appearance, and its easily adjusted size and shape, is particularly suitable for use on mobile homes and the like and is far more compatible with the general scheme and aesthetic appearance of mobile homes and the like than are conventional shutters. Moreover, the very light weight and simple construction of the present invention enables attachment of the shutter to the side of the mobile home and the like with the use of small and simple fastening means without necessitating substantial fasteners and consequent damage to the side of the mobile home as would be required with the heavier shutters. The extremely simple punched tab and stringer construction for holding the shutter panels in assembled relation and the easily adjusted size and shape of the stringers and panels permit ready alteration of the size and appearance of the shutter without necessitating the purchase of a different shutter for different size and shape requirements as would be the case with conventional shutters. Stated another way, the appearance of the shutter of the present invention can quite easily be changed simply by repositioning of the wide and narrow panels on the stringers or by changing the arrangement and/or size of the wide and narrow panels or the stringers or by adding or eliminating panels as desired. Further, the ease with which the shutters are assembled and disassembled is particularly desirable when the mobile home or the like is to be transported since most states have laws prohibiting extensions or protrusions on mobile homes when they are being transported on the highways of those states.

DETAILED DESCRIPTION OF THE INVENTION

Figure 1:
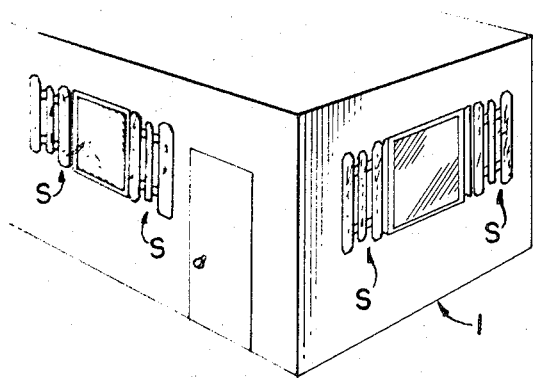
FIG. 1 is a schematic perspective view showing decorative shutters according to the present invention assembled on a mobile home.

Referring to FIG. 1, a mobile home 1 has decorative shutters S according to the present invention affixed thereto.

Figure 2:
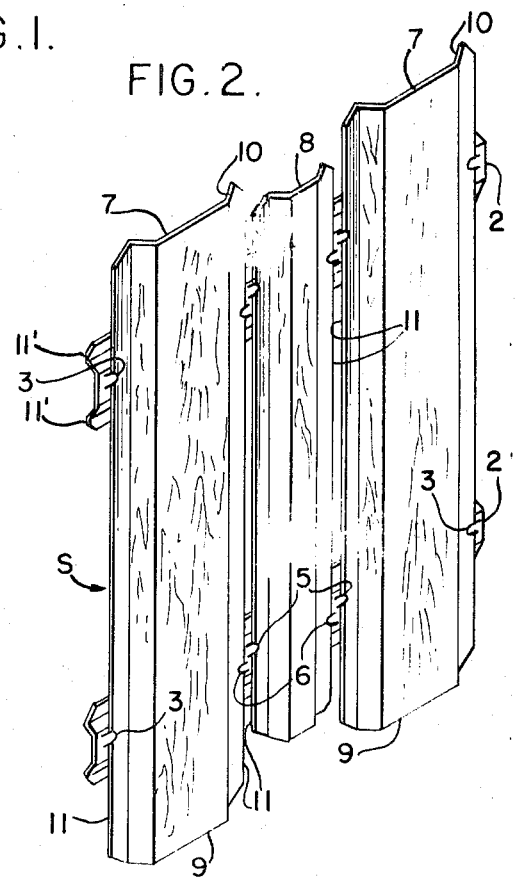
FIG. 2 is a perspective view illustrating one embodiment of an assembled shutter.
Figure 3:
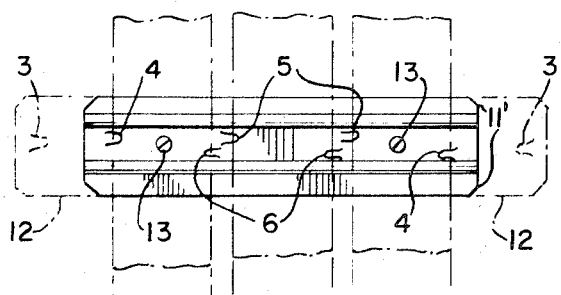
FIG. 3 is a view in elevation with the shutter panels shown in phantom lines illustrating another configuration which the shutter, according to the present invention, can take with three narrow panels assembled on a stringer and the extreme end portions of the stringer cut off.
Figure 4:
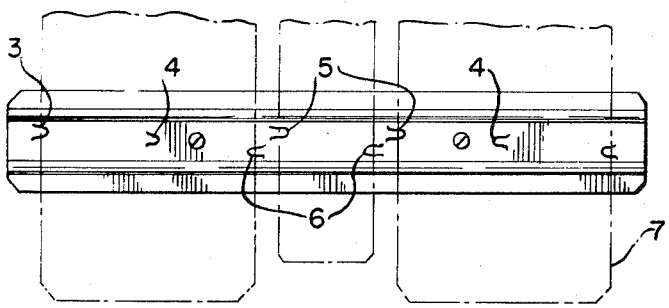
FIG. 4 is a view similar to FIG. 3 and illustrates another form which the shutter of the present invention can take with a wide panel on each end of the stringer and a narrow panel between the wide panels.

In the embodiments shown in FIGS. 2, 3 and 4, details of the shutter S can be clearly seen as comprising a pair of horizontally disposed stringers 2 each having an end tab 3 punched adjacent each end thereof substantially on the longitudinal axis of the stringer and pointing inwardly from the ends toward the center of the stringer. Spaced inwardly from the punched tabs 3 at opposite ends of the stringer are intermediate punched tabs 4 also disposed substantially on the longitudinal axis of the stringer and pointing inwardly toward the center of the stringer. Spaced equidistantly on opposite sides of the longitudinal axis of the stringer and inwardly from intermediate tabs 4 are oppositely longitudinally pointing pairs of punched inner tabs comprising upper tabs 5 facing toward one end of the stringer and lower tabs 6 facing toward the other end of the stringer. The bases of adjacent tabs 5 and 6 are disposed on a common vertical line with respect to the stringer 2. A plurality of decorative shutter panels 7 and 8 each comprising an elongated flat face portion 9 having integral angularly extending skirts 10 along opposite longitudinal edges thereof are assembled on the stringers 2. The free edges of the skirts 10 are bent laterally outwardly from the skirts to form oppositely directed edge flanges 11 along each longitudinal edge of the panels parallel to the face 9, the edges 11 received behind the tabs punched in the stringers. As seen most clearly in FIGS. 3 and 4, the corners of the flanges on the panels and stringers are cut at 45 angle, eliminating sharp corners and presenting a more pleasing appearance.

As shown in FIGS. 2 and 4, one embodiment of the invention comprises two relatively wide panels 7 fixed at opposite ends of the stringers with the opposite edge flanges 11 of the left panel as viewed in these figures disposed behind tabs 3 and 6 at one end of each stringer, and the opposite edge flanges 11 of the right panel as viewed in these figures disposed behind tabs 3 and 5 at the other end of each stringer. A shortened center panel 8 of relatively narrower width than panels 7 and of the same width as the stringers 2 is fixed to the stringers between panels 7 with its opposite edge flanges 11 disposed behind oppositely pointing tabs 5 and 6 of the pairs of tabs of each stringer. In this arrangement of the panels 7 and 8, the intermediate tabs 4 are hidden from view behind the end panels 7.

As shown in FIG. 3, another form of the invention comprises three narrow panels 8, all of the same length, secured to the stringer 2 with the end panel on the left having its opposite edge flanges 11 disposed behind tabs 4 and 6 at the left end of the stringer, and the end panel on the right having its edge flanges 11 disposed behind the pair of tabs 4 and 5 on the right end of the stringer. The center panel is secured to the stringer with its opposite edge flanges 11 disposed behind a pair of tabs 5 and 6 as in the FIG. 2 embodiment. The extending end portions 12, shown in dotted lines in FIG. 3, are cut off in this form of the invention and, as is apparent, a narrower shutter than that shown in FIGS. 2 and 4 is provided having shutter panels all of the same width and length. Of course, either the center panel of the end panels could be shortened in this embodiment if desired.

Figure 5:
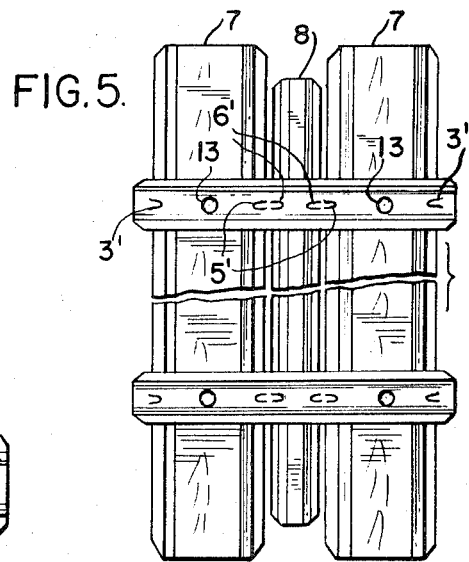
FIG. 5 is a rear view in elevation of yet another form of shutter according to the present invention illustrating a different arrangement of punched tabs in the stringers and showing how the fasteners are hidden from view behind the end panels.

In FIG. 5, a variation on the arrangement of tabs on the stringers is shown. In this embodiment, a plurality of aligned pairs of oppositely directed tabs are provided for holding the shutter panels assembled to the stringers. More particularly, end tabs 3' are punched adjacent the opposite ends of each stringer and point inwardly along the longitudinal axis of the stringer. A pair of outwardly, oppositely pointing spaced tabs 5' are spaced inwardly along the axis of the stringer from tabs 3' and a pair of inwardly oppositely pointing spaced tabs 6' are spaced inwardly along the axis of the stringer from the tabs 5'. As is apparent from FIG. 5, the opposite edge flanges 11 of the end panels 7 are received behind the pairs of tabs 3', 5' and the opposite edge flanges 11 of the center panel 8 are received behind the pairs of tabs 6'. Openings 13 for receipt of suitable fasteners are formed in the face 9 of the stringers between the pairs of tabs 3', 5'.

In each of the embodiments shown, the stringers 2 are formed simply by punching tabs in a narrow panel 8, thus reducing the number of separate parts or extrusions required and substantially reducing the cost of the shutter.

The shutters according to the present invention are attached to the side of the mobile home or the like by means of suitable fasteners such as screws or the like received through holes 13 in the face 9 of the stringers into the side of the mobile home. Alternatively, or conjointly therewith, screws or the like could be received through holes in the flanges 11' of the stringer. The stringers and panels comprising the shutter of the present invention may be painted in a desired color or in a combination of colors or as shown in FIG. 2, they may be embossed with a simulated wood grain design. Once the stringers have been attached to the side of the mobile home or the like, the panels are then attached to the stringers simply by squeezing or flexing the opposite edge flanges 11 inwardly by exerting pressure on opposite edges of the panel, placing the panel against the stringer with the opposite edge flanges 11 disposed between a pair of tabs and then releasing the pressure so that the natural resiliency of the panel will cause the panel to flex outwardly and return to its original shape with the opposite edge flanges 11 disposed under or behind the appropriate tabs. The assembled panel is both rigid and light and requires very little effort to assemble and affix to the side of the mobile home or the like and is exceptionally economical. The simplicity of construction and the lightness of the material used renders the shutter according to the present invention capable of ready adjustment, assembly, disassembly and alteration in shape, size and design.

While particular embodiments of the invention have been described herein, it is to be understood that various modifications to the invention can be made without departing from the spirit of the invention.

I claim:

1. A decorative shutter for mobile homes and the like, comprising at least a pair of vertically spaced, horizontally disposed, substantially parallel stringers; a plurality of equally spaced tabs on said stringers along the length thereof, said tabs including a pair of end tabs disposed adjacent opposite ends of each said stringer and pointing longitudinally inwardly along said stringer, a pair of intermediate tabs spaced on opposite sides of the longitudinal center of each said stringer, each said intermediate tab being the next adjacent tab to a corresponding one of the end tabs and disposed between said one end tab and the longitudinal center of said stringer, said intermediate tabs also pointing toward the longitudinal center of said stringer, and at least one pair of adjacent, oppositely pointing inner tabs disposed between said pair of intermediate tabs adjacent the longitudinal center of each said stringer; and a plurality of vertically disposed; horizontally spaced, substantially parallel panels having a preselected width substantially equal to the spacing between selected pairs of said tabs, said panels having opposite longitudinal edges received between and behind adjacent, oppositely pointing tabs on said stringers, the spacing between said end tabs and said intermediate tabs and the adjacent pair of inner, oppositely pointing tabs being such as to enable said stringers to selectively accommodate end panels of different width.

2. A decorative shutter as in claim 1, wherein two pairs of spaced-apart, oppositely pointing inner tabs are on said stringer on opposite sides of the longitudinal center thereof, each pair of inner tabs positioned between the longitudinal center of the stringer and a corresponding intermediate tab.

3. A decorative shutter as in claim 2, wherein an end panel is received between each said intermediate tab and one of the tabs in an adjacent pair of inner tabs, and an intermediate panel is received between the other tabs in said spaced pairs of inner tabs.

4. A decorative shutter as in claim 2, wherein an end panel is received between each said end tab and one of the tabs in an adjacent pair of inner tabs, said intermediate tabs being hidden behind and concealed from view by said end panels, and an intermediate panel received between the other tabs in said spaced pair of inner tabs.

* * * * *